United States Patent [19]

Peralta et al.

[11] Patent Number: 4,562,439
[45] Date of Patent: Dec. 31, 1985

[54] IMAGING RADAR SEEKER

[75] Inventors: Eduardo J. Peralta, Santa Ana; Kay M. Reitz, Tustin, both of Calif.

[73] Assignee: Ford Aerospace & Communications Corporation, Detroit, Mich.

[21] Appl. No.: 449,102

[22] Filed: Dec. 13, 1982

[51] Int. Cl.$^4$ ................................................ G01S 7/28
[52] U.S. Cl. .............................. 343/17.1 R; 343/5 FT
[58] Field of Search ............... 343/5 FT, 17, 375, 766, 343/765, 763, 708, 398

[56] References Cited

U.S. PATENT DOCUMENTS

| | | | |
|---|---|---|---|
| 3,821,736 | 6/1974 | Kuck et al. | 343/7.7 |
| 3,878,525 | 4/1975 | Alpers | 343/14 |
| 4,203,113 | 5/1980 | Baghdady | 343/14 |
| 4,320,397 | 3/1982 | Constantinides | 343/795 |
| 4,450,444 | 5/1984 | Wehner et al. | 343/5 CM |

Primary Examiner—Thomas H. Tarcza
Assistant Examiner—Mark Hellner
Attorney, Agent, or Firm—Edward J. Radlo; Robert D. Sanborn

[57] ABSTRACT

An imaging radar seeker (8) for producing two-dimensional images of a target (2) is mounted on a missile (6) or other moving body, such as an automobile. A computer (40) directs the seeker (8) to operate sequentially in searching, tracking, and imaging modes. In the searching mode, a combination of circumferential rotation of antenna (12) of seeker (8) and frequency scanning of electromagnetic energy fed to antenna (12) enables seeker (8) to search for its target (2) over a conical field-of-view (16) or a wider, peripheral belt field-of-view (16). In the imaging mode, circumferential rotation of antenna (12) is stopped, and the tilt angle (A) of the linear array (32) of antenna (12) is stepped or continuously moved to compensate for radial movement of the radiated beam (14) caused by frequency stepping imparted by a frequency synthesizer (20). This keeps the beam (14) fixed in space and centered on target (2). Inverse synthetic aperture imaging is used to create a two-dimensional image (4) of target (2) wherein the first dimension (range) is obtained by performing inverse Fourier transforms on the echo signals, and the second orthogonal dimension (cross-range or doppler frequency) is obtained by performing Fourier transforms. Array (32) can be a linear array of E-plane stacked linear waveguide antenna elements (38) operating in either the traveling wave mode or the standing wave mode.

5 Claims, 12 Drawing Figures

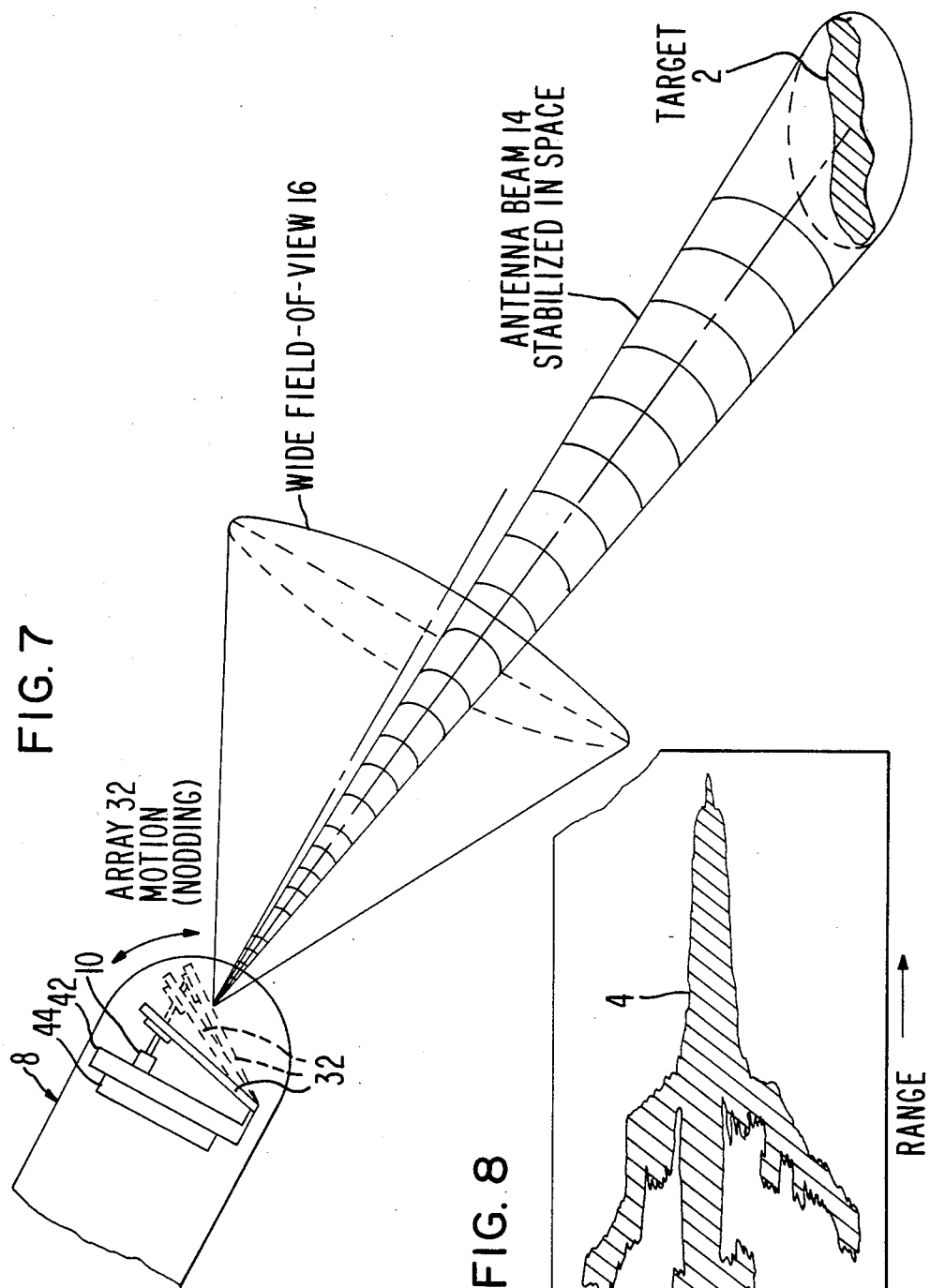

IMAGING RADAR SEEKER

TECHNICAL FIELD

This invention pertains to the field of radar systems which obtain two-dimensional images of targets.

BACKGROUND ART

None of the following references, which were located by means of a search in the public records of the U.S. Patent and Trademark Office, shows a radar imaging system and an antenna suitable therefor, as in the present invention:

U.S. Pat. No. 3,673,606 discloses an array antenna using phase shifters. The antenna disclosed in the instant specification produces narrow beams at millimeter frequencies without using phase shifters.

U.S. Pat. No. 3,953,857 discloses a search and track directional antenna using phase shifters, which the present invention avoids.

U.S. Pat. No. 4,070,678 discloses an antenna mounted on a two-axis gimbal for steering beams through wide angles. The antenna of the present invention avoids bulky gimbals.

U.S. Pat. No. 4,203,113 discloses a radar system which can be used for an automobile application.

U.S. Pat. No. 4,297,708 discloses a system for correcting dispersion in a beam radiated by a flat microwave antenna due to variations in the frequency of operation by providing an electronically controlled phase shift of the beam in the plane of the dispersion.

Other references are U.S. Pat. Nos. 3,680,085; 3,821,736; and 3,878,525.

DISCLOSURE OF INVENTION

The imaging radar seeker (8) of the present invention is capable of forming two-dimensional images (4) of targets (2). The seeker (8) can be mounted on a guided missile (6), an automobile, or any other carrying body where a small imaging radar seeker (8) of very high spatial resolution is desired.

The seeker (8) is operated at frequencies that are as high as are technologically feasible, e.g., 94 GHz, in order to facilitate the imaging.

The image (4) is a two-dimensional representation of a planar projection of the target (2). This image (4) can be displayed in freeze-frame or real-time by a computer (40) on board the carrying body or at a remote location, e.g., the body which launched the missile (6), by techniques of signal processing.

The seeker (8) uses frequency stepping imparted by a frequency synthesizer (20) as the means for obtaining range information (first dimension), and doppler processing for obtaining cross-range information (second dimension). A hybrid (electronic/mechanical) antenna (12) produces a beam (14) that is stabilized in space during imaging. Radial deviations of the radiated beam (14) caused by the electronic frequency stepping are compensated for by means of a motor (10) which adjusts the angle (A) between the plane of the antenna array (32) and a plane (42) that is normal to the seeker (8) axis (Z-axis).

Circumferential rotation of antenna (12) is used during searching of the target (2), and circumferential adjustments are made for tracking target (2) and for decoupling the seeker (8) from movement of the missile (6) or other carrying body.

This circumferential motion is imparted by a rotating turntable (18) upon the which the antenna array (32) is mounted. Radial decouplings between movement of the crrying body and the seeker (8) are typically accomplished by motor (10) but could also be accomplished by the frequency synthesizer (20).

When the seeker (8) is in its searching mode, computer (40) superimposes signals onto the decoupling signals to the turntable (18) to command turntable (18) to rotate at a fixed rate. When the seeker (8) is in its tracking mode, computer (40) superimposes the required circumferential and radial tracking information onto the decoupling signals to the turntable (18) and the motor (10). When seeker (8) is in its imaging mode, computer (40) superimposes nodding signals to motor (10) onto the decoupling and tracking signals to motor (10) in order to maintain stabilization in space of beam (14), while not sending additional signals to turntable (18).

The radar receiver (36) can be mounted on board the carrying body, or elsewhere.

The antenna (12) is a planar array (32) of linear waveguide elements (38) fed by a serpentine feed (22).

Depending upon the tilt angle (A) of the antenna array (32), the field-of-view (FOV) (16) of the seeker (8) can be a cone aligned along the Z-axis of a "peripheral vision" belt.

Advantageous characteristics of seeker (8) of the present invention include:

It is mechanically simple, as it avoids the complexities of two-axis gimbals ordinarily used in seekers; it can be ruggedized.

Its electronics portion is simple, leading to lower cost, smaller size, and increased reliability.

Its high speed searching capability enables autonomous fire-and-forget missile (6) operation, and allows for applications where fast reaction and/or short mission times are required.

Its field of applicability is wide, e.g., missiles (6), automobiles, cannon launched projectiles, target acquisition pods, etc.

It offers a very high imaging resolution capability not limited by analog-to-digital conversion speeds.

Its fast data acquisition speed makes seeker (8) compatible with a variety of signal processing techniques.

Wide field-of-view (16), narrow field-of-view (14), staring, and imaging are combined in a single seeker (8).

Computer (40) enables seeker (8) to flexibly and adaptively operate in many different modes for various missions.

BRIEF DESCRIPTION OF THE DRAWINGS

FIG. 7 illustrates seeker 8 focusing a stabilized beam 14 upon target 2;

FIG. 8 is an example of an image 4 generated by the present invention;

DETAILED DESCRIPTION OF THE PREFERRED EMBODIMENTS

Figure 1:
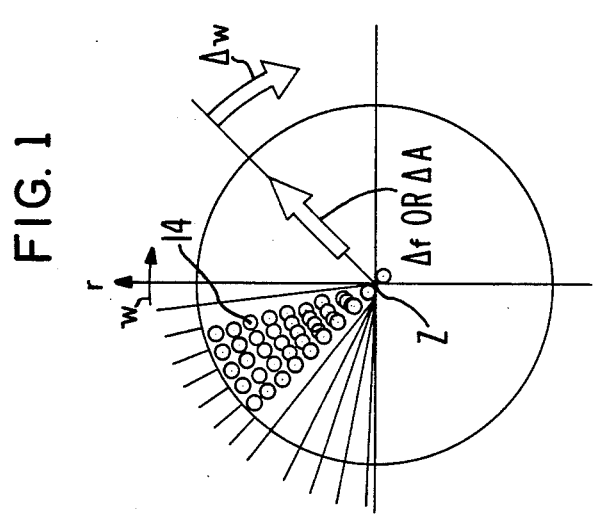
FIG. 1 is an end view sketch looking down onto the nose of missile 6, illustrating the effects of frequency and A stepping and turntable 18 rotation upon the spatial placement of beam 14.

Seeker 8 of the present invention performs imaging of targets 2 which may be stationary or moving, on the ground or airborne, through the use of inverse synthetic aperture (ISAR) techniques made possible by the relative motion of target 2 itself. Even for stationary targets 2, doppler exists in the signal reflected to seeker 8 because of the relative motion between seeker 8 and target 2 due to the motion of seeker 8. The presence of a radial velocity gradient across target 2 allows for formation of image 4 by association of the time delay and doppler of each scattering center of target 2. Range resolution is a function of bandwidth of the radiated signal 14; the wider the bandwidth, the better the resolution. Cross-range resolution is inversely proportional to the coherent integration time interval, i.e., the time of one data frame 28, which comprises several bursts 26 of transmitted pulses 24.

The detailed description herein illustrates an illuminating radar seeker 8 on board a missile 6, e.g., for countering air defense radar targets 2, but seeker 8 can be used on automobiles, boats, or elsewhere. Computer 40 commands missile 6 to operate in the following modes, in the following order: searching, acquisition, tracking, imaging, homing, and fuzing. There can be overlap between some of these modes. For example, imaging can overlap with tracking, homing, and fuzing. Furthermore, computer 40 sends decoupling signals to turntable 18 and motor 10 during all of these modes, to decouple the movement of missile 6 from that of seeker 8.

Seeker 8 is located at the nose of missile 6. As shown in FIG. 1, an end view looking at the nose of missile 6 along its longitudinal axis (which is also the longitudinal axis of seeker 8 and is hereinafter referred to as the Z-axis), a change ($\Delta f$) in frequency f of the beam 14 radiated by seeker 8 and/or a change ($\Delta A$) in angle A causes the boresight of beam 14 to move along the radial (r) direction. A movement of turntable 18 ($\Delta w$) moves beam 14 in the circumferential (w) direction. Since the r-axis and w-axis are orthogonal, this arrangement provides complete two-axis control of beam 14, rendering unnecessary a conventional bulky two-axis gimbal.

Figure 2:
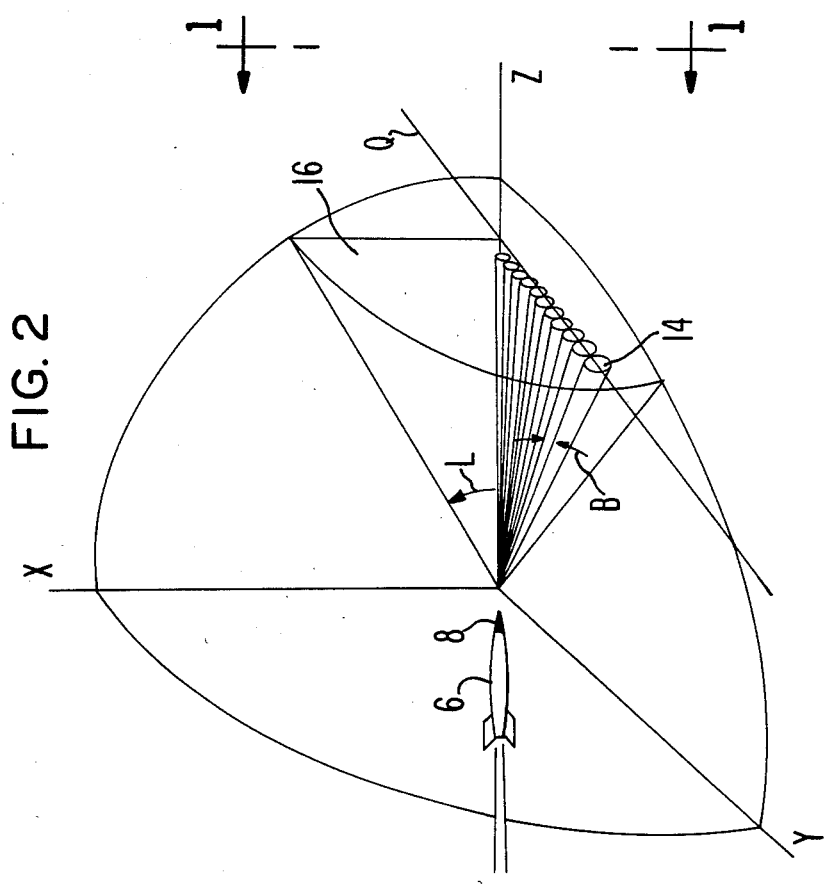
FIG. 2 is a side view sketch of seeker 8 mounted at the nose of missile 6, showing a conical field-of-view 16.

FIG. 2 shows a set of narrow beams 14 radiated by antenna 12. Such a set of beams 14 could be generated by changing f and/or A. Beams 14 are aligned in plane Q, the radial scan plane, which corresponds to a fixed value of w. During the scanning mode, scanning the frequency throughout the range of synthesizer 20 and rotating turntable 18 through a full 360° (see FIG. 5) allows beam 14 to assume any position within a conical field-of-view (FOV) 16. For purposes of clarity, FIG. 2 shows only a quarter of cone 16.

Seeker 8 is constrained to have a maximum radial scan limit defined as L, the angle between the radially most remote beam 14 and the Z-axis. A suitable value of L, which is preselected according to mission requirements, is 20° and is assumed herein unless otherwise indicated. Beam 14 has a 3 dB angular beamwidth of B. The cross-section of beam 14 is circular in this illustration because the number of slots 60 per element 38 is equal to the number of elements 38 in antenna array 32 (see FIG. 4). B is a function of antenna 12 size, element 38 spacing d, and missile 6 size, and is typically between 1.5° and 2.7°.

During the scanning mode, the scan time $T_s$, which is the time required for turntable 18 to make one revolution, should be very fast to satisfy mission requirements, and to establish enough data hits, H, for proper target 2 detection.

$$T_s = 4\pi R_m \cdot H \sin^2 L / B^2 c$$

where $R_m$ is in the maximum unambiguous range and c is the velocity of light.

Figure 9:
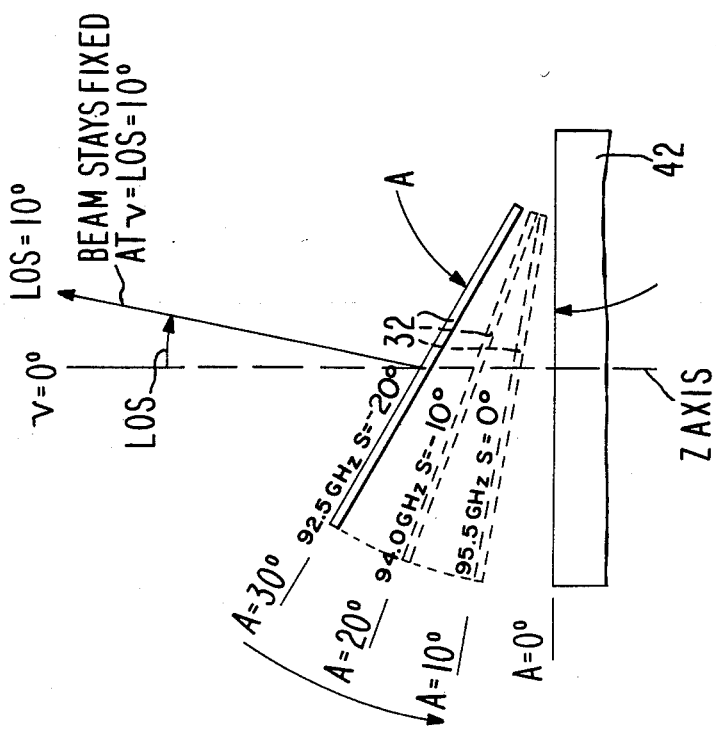
FIG. 9, which is drawn in the radial scan plane Q, illustrates the angular relationships between beam 14 and array 32.

$T_s$ is a nonlinear function of L (or, equivalently, of beam 14 angular position v—see FIG. 9). For targets 2 located in the central region of FOV 16, a larger quantity of data can be gathered in a shorter length of time than for targets 2 located near the periphery of FOV 16.

For an arbitrarily selected $T_s = 0.5$ seconds, $R_m = 15$ km, and $L = 20$ degrees, $H = 10$ for even the worst case (beams 14 located on the periphery of FOV 16). $T_s$ is normally set to be within 0.1 second and 0.5 seconds.

Figure 3:
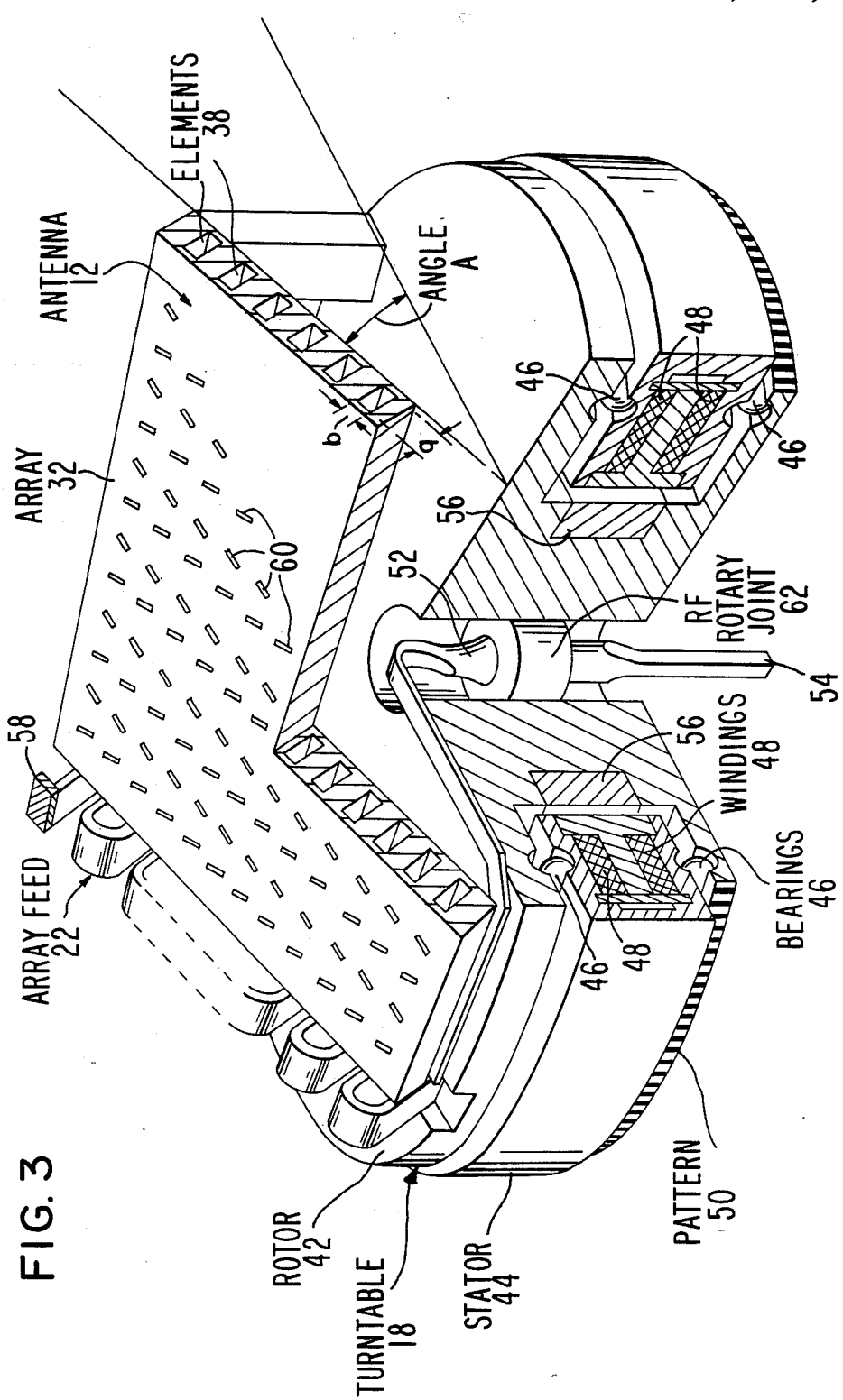
FIG. 3 is a broken-away elevational sketch of antenna 12 of the present invention.

FIG. 3 shows antenna 12 comprising a planar array 32 of slotted linear waveguide elements 38. Serpentine feed 22 is illustrated along one edge of array 32, terminating in resistive load 58. Similar resistive loads terminate the unfed ends of elements 38, but are not shown in this broken-away sketch. Coupling slots within feed 22 (not illustrated) couple r.f. energy from feed 22 to each element 38. In this embodiment, elements 32 are individual traveling wave antennas. Array 32 is tilted by angle A with respect to the plane of rotor 42 of turntable 18 (which is normal to the Z-axis). During the scanning mode, angle A is fixed to be equal to or slightly greater than one-half the preselected L, advantageously reducing the range of scan caused by frequency synthesizer 20 to one-half L. Tilting array 32 also eliminates the need to scan through the array normal, avoiding impedance mismatch problems.

It is assumed throughout this specification that antenna 12 has a three inch active aperture (e.g., array 32 is a square three inches on a side), and the cross-section to the Z-axis of missile 6 has a diameter of five inches. If a larger antenna 12 is used, seeker 8 will have additional signal gain. This design can provide a 33.5 dB gain at 94 GHz while meeting reasonable beamwidth, scan angle, and other system requirements. As the wavelength of radiated energy 14 is decreased into the millimeter range, antenna 12 becomes difficult to fabricate mechanically, but high definition photolithography can help overcome this problem.

In a second feeding embodiment, feed 22 is centered along the back of array 32, dividing array 32 into a left-hand set of standing wave elements 38 and a right-hand set of standing wave elements 38.

Turntable 18 comprises a stationary (with respect to missile 6) stator 44 and a rotating rotor 42, each of whose large substantially circular surfaces are orthogonal to the Z-axis. Turntable 18 can be, e.g., a flat induction motor. FIG. 3 illustrates magnet 56 mounted to rotor 42 and conductive windings 48 on stator 44, which provide the necessary force to create rotation of rotor 42 with respect to stator 44 when electrical current is passed through windings 48. Bearings 46 lessen the friction between rotor 42 and stator 44. Electromagnetic energy at r.f. is applied to antenna 12 via stationary lower waveguide 54 which connects via RF rotary joint 62 to rotating upper waveguide 52 and thence to feed 22 and elements 38. An alternating black and white pattern 50 is inscribed on a lower portion of rotor 42 to facilitate the determination of angle w by optical means (not illustrated) mounted on seeker 8. This determination can then be fed back to computer 40.

Figure 4:
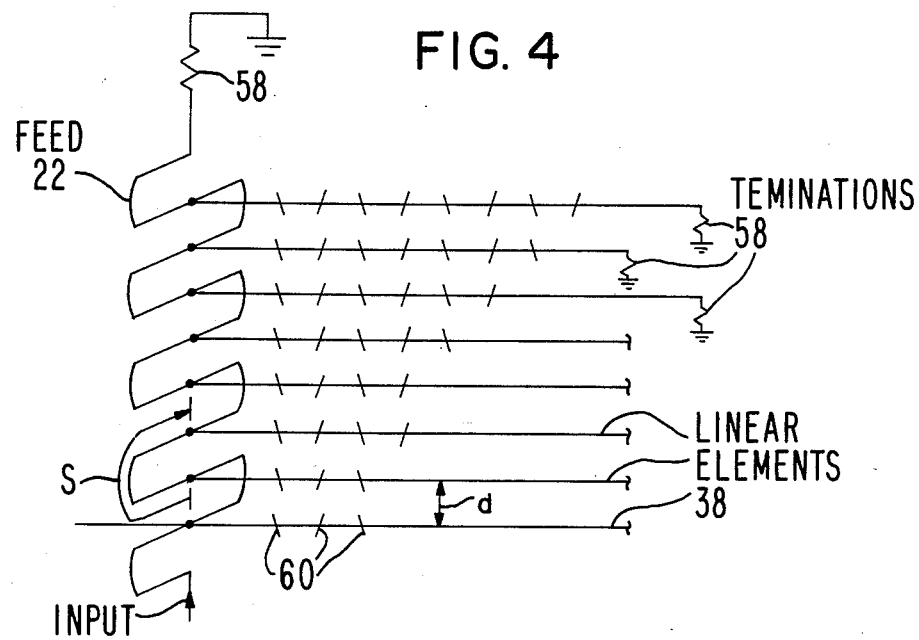
FIG. 4 is a schematic diagram of the feed network of antenna 12.

FIG. 4 shows that feed 22 is "serpentine", i.e., it follows a snakelike path, because the phasing length S of feed 22 (distance along feed 22 between adjacent elements 38) is large compared with the spacing d between adjacent elements 38. Slots 60 are cut equi-spaced into elements 38 approximately one-half waveguide wavelength (at the high end of the frequency range) apart so that antenna 12 will radiate a narrow beam 14 which is substantially orthogonal (broadside) to the plane of array 32. The slots 60 are typically one-tenth of a waveguide wavelength wide. Each slot 60 makes an angle of between 10° and 15° (depending upon the desired radiation characteristics) with respect to the normal to the longitudinal axis of its associated element 38. The sign of this angle alternates from slot to slot as the element 38 is traversed. The length of each slot 60 is sufficient to traverse the entire dimension of the associated element 38 wall.

As frequency f is changed, the boresight of beam 14 always remains in a plane (the radial scan plane Q) which is orthogonal to array 32 and parallel to the major longitudinal axis of feed 22, while scan angle s (the angle between the boresight of beam 14 and the normal to array 32) changes accordingly (see FIG. 9, which is drawn in plane Q). Reducing the number of elements 38 in array 32 serves to spread out the beamwidth B of beam 14 in plane Q. Reducing the length of elements 38 serves to spread out the beamwidth of beam 14 in a plane orthogonal to plane Q.

Feed 22 and element 38 waveguides have typically the same rectangular cross-section, q in width and h in height, where q is greater than h.

The following frequency-scan equation shows the parameters traded during the array 32 design process:

$$\sin s = (S/d)(W_o/W_g - W_o/W_{go})$$

where
    $W_o$=free space wavelength
    $W_g$=wavelength within feed 22 and elements 38
    $W_{go}$=wavelength within feed 22 and elements 38 at broadside frequency, i.e., beam 14 is orthogonal to array 32.

For a required maximum s (which for convenience is assumed to be equal to L), an increase in frequency bandwidth allows a decrease in S or an increase in d, or both; in either case, fabrication of antenna 12 is facilitated. Packaging and attenuation considerations place an upper limit on S. Grating lobe formation places an upper limit on d. The minimum bend radius of waveguide 22 places a lower limit on d. The rate of change of $W_g$ as a function of frequency places an upper limit on q. Waveguide cutoff ($W_g/2$) places a lower limit on q.

To design array 32, d is first calculated from grating lobe considerations. Then a waveguide width q is determined. S is then obtained from the scan equation, and beam 14 scan angle s versus frequency f is calculated.

One common grating lobe criterion, wherein a lobe is situated in the plane of array 32, is given by $$d/W_o \leq 1/(\sin L + 1)$$

Assuming that L=20 degrees and transmitter considerations call for a bandwidth of 3 GHz (between 92.5 GHz and 95.5 GHz), the allowable d becomes 0.095 inch. If grating lobe suppression is not aided by the element factor of elements 38, a more restrictive criterion can be adopted, in which the element spacing d causes a grating lobe null at −90° (with respect to array 32 broadside) and the entire grating lobe is in imaginary space. This maximum spacing for d is 0.090 inch, and is adopted for this example.

q is a factor in the frequency scan equation because it establishes $W_g$ as $$W_g = W_o/(1-(W_o/2q)^2)^{\frac{1}{2}}$$

The rate at which $W_o/W_g$ changes with frequency increases as q decreases towards its cutoff value. Waveguide 22, 38 attenuation also increases as q decreases. The compromise that is usually made in choosing q is a value for which attenuation and dispersion (change in $W_g$ with frequency) are balanced so that pulse 24 distortion, waveguide 22, 38 loss, and the length of feed 22 are acceptable values. In most cases, q is specified so that $W_o/W_g$ is about 0.7. From the above equation, a value of q=0.090 inch is found to be consistent with the specified ratio, and is selected here for both the feed 22 and element 38 waveguides.

Thus, d and q have the same value, 0.090 inch. The walls of waveguide 22, 38 are typically 0.005 inches thick; they affect slot 60 coupling and array 32 impedance. Since the walls of elements 38 must have finite thickness, elements 38 cannot be stacked width-by-width (H-plane stacking). However, minimum spacing for E-plane stacking (height-by-height) is well within the 0.090 inch limit and is therefore used. h is typically 0.040 inch. The E-plane configuration permits a reduction in d to accommodate greater values of L (to 50 degrees) without grating lobes. This permits a wider range of mission scenarios.

Using a value of q=0.090 inch, $W_o$ and $W_g$ as functions of frequency from the above equation are provided in Table 1.

TABLE 1

| Waveguide Wavelength as a Function of f | | |
|---|---|---|
| Freq. (GHz) | $W_o$ (inches) | $W_g$ (inches) |
| 92.5 | .12757 | .1808 |
| 93.0 | .12688 | .1789 |
| 93.5 | .12620 | .1770 |
| 94.0 | .12553 | .1752 |
| 94.5 | .12486 | .1734 |
| 95.0 | .12421 | .1716 |
| 95.5 | .12356 | .1699 ($W_{go}$) |

At the frequency of 95.5 Ghz, beam 14 boresight is broadside to array 32 (s=0°), and $W_g = W_{go}$. Substituting these values into the scan equation, S becomes 0.6800=4$W_{go}$. All quantities in the scan equation are now known, and beam 14 scan angle s versus frequency is tabulated in Table 2.

TABLE 2

Scan angle s as a Function of f

| Freq. (GHz) | Scan angle s (degrees) |
| --- | --- |
| 92.5 | −20.00 |
| 93.0 | −16.45 |
| 93.5 | −12.96 |
| 94.0 | −9.63 |
| 94.5 | −6.48 |
| 95.0 | −3.24 |
| 95.5 | 0.00 |

Note that as the frequency decreases within the range, s decreases. This is because the scan equation was derived assuming that a negative frequency shift causes a negative beam 14 shift.

In the second feeding embodiment, feed 22 is centered on the back face of array 32. The linear elements 38 are now center-fed (they were end-fed in the first embodiment) from coupling slots in a conductive wall common to feed 22 and elements 38. Each 3-inch long element 38 now becomes two 1.5 inch long elements 38 in parallel, as viewed from the center-feed point. The elements 38 are now short enough to be operated as standing wave type, with short-circuit terminations, instead of traveling wave type with dissipative terminations as in the first embodiment.

Several advantages accrue to this second embodiment, including:

No dissipative load 58 is needed for each element 38, making for higher efficiency and lower cost.

The radiating aperture size of array 32 is increased since feed 22 no longer blocks part of the aperture. The result is higher antenna 12 gain.

Beam 14 scanning in the plane of array 32, which is characteristic of broadband traveling wave arrays, is eliminated. This simplifies beam 14 scan control and processing.

The mass of the rotating elements of antenna 12 is better balanced, preserving structural integrity at high rotational speeds.

For either the first or second feeding embodiments, the inner surfaces of feed 22 and elements 38 should be very smooth; have dimensional accuracy of ±0.0002"; and have the conductivity of silver or copper to minimize loss.

Alternative to a planar waveguide array antenna 12, a planar slotted stripline array or a parallel cylinder reflector could be used.

Figure 5:
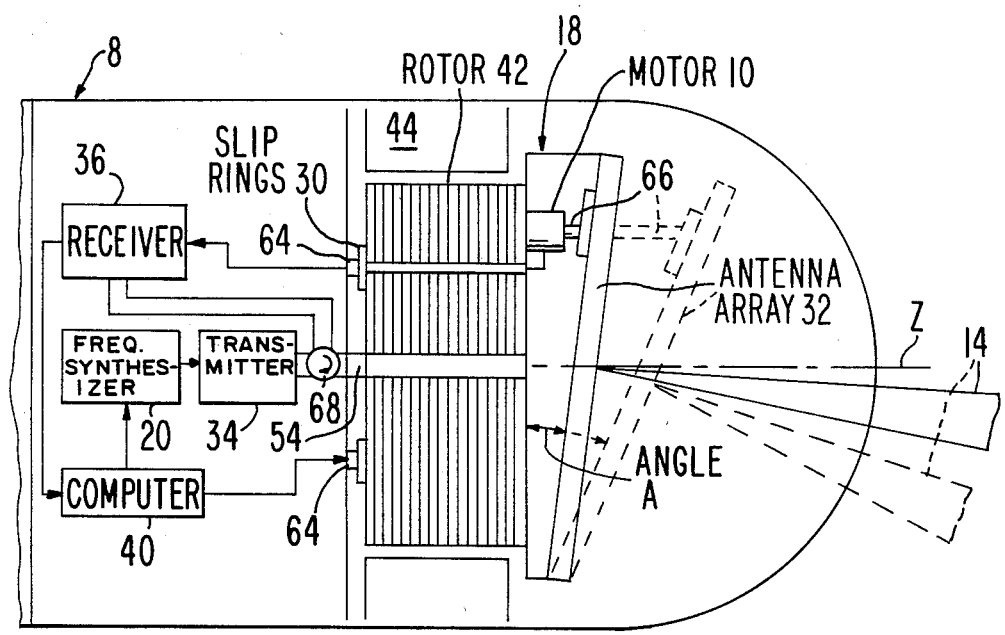
FIG. 5 is a schematic side view of seeker 8 of the present invention.

FIG. 5 shows how motor 10 changes angle A. Motor 10 is fixedly mounted on rotor 42. In response to control signals from computer 40, motor 10 actuates linear extension rod 66, the extension of which causes A to increase. The control signals from computer 40 are sent via conductive track 64 fixedly mounted on the aft stationary portion of seeker 8; slip rings 30 fixedly mounted on rotor 42 maintain mechanical and electrical contact with track 64 as rotor 42 is rotated.

Computer 40, which is shown on board missile 6 (but which could be elsewhere and communicate with seeker 8 by radio means), commands synthesizer 20 to execute the desired frequency stepping sequence. Synthesizer 20 sets the frequency of transmitter 34, which outputs r.f. energy to antenna 12 via lower waveguide 54 fixedly mounted on seeker 8. Transmitter 34 typically has an average output power of one watt.

FIG. 5 shows the embodiment where receiver 36 is mounted on board missile 6. In this embodiment, receiver 36 and transmitter 34 use the same antenna 12, are separated by isolator 68, and can share the same frequency sweep generator (not illustrated).

A logarithmic i.f. amplifier can be used within receiver 36 to accommodate the large dynamic range produced by the combination of antenna 12 gain, range variation, and multipath fading. The use of a superheterodyne, as opposed to a crystal video, receiver 36 will provide higher sensitivity. Two virtually identical receivers 36 can be used to accommodate monopulse tracking during the tracking mode, one channel used for the "sum" antenna pattern signal processing and the other for the "difference" antenna pattern signal processing. The two receivers 36 can be packaged side-by-side in one assembly and utilize common control circuits.

Computer 40 can be a digital processor employing two 16-bit LSI microprocessors. The LSI microprocessors operate in a fetch-overlap procedure which permits the high execution rates (seven million instructions per second) necessary for complex FFT implementation and digital waveform generation. Computer 40 controls synchronization between the transmitted pulses 24 and received echoes, and generation of the transmitted pulsetrain. Since it is programmable, computer 40 allows for controlled variations of waveform, operating modes, and system parameters.

The signal produced by transmitter 34 (FIG. 6) consists of a sequence of common-amplitude pulses 24, where the frequency f of each successive pulse 24 is increased by a constant step increment $\Delta f$. Hence, the expression "frequency stepping" is appropriate.

Conventional high resolution radars that use wide bandwidth signals require the use of high sampling rates for the digital processing. Therefore, range resolution with these radars is limited by analog-to-digital conversion speeds. In contrast, the frequency stepping seeker 8 of the present invention does not require a large instantaneous bandwidth, and as a result sampling rates are low and do not limit resolution. At millimeter wave frequencies, for example, a 150 MHz bandwidth transmitted signal can yield one meter resolution. This advantage leads to lower cost electronics. The stepped frequency waveform removes the requirements for both wide instantaneous bandwidth and high sampling rates.

Figure 6:
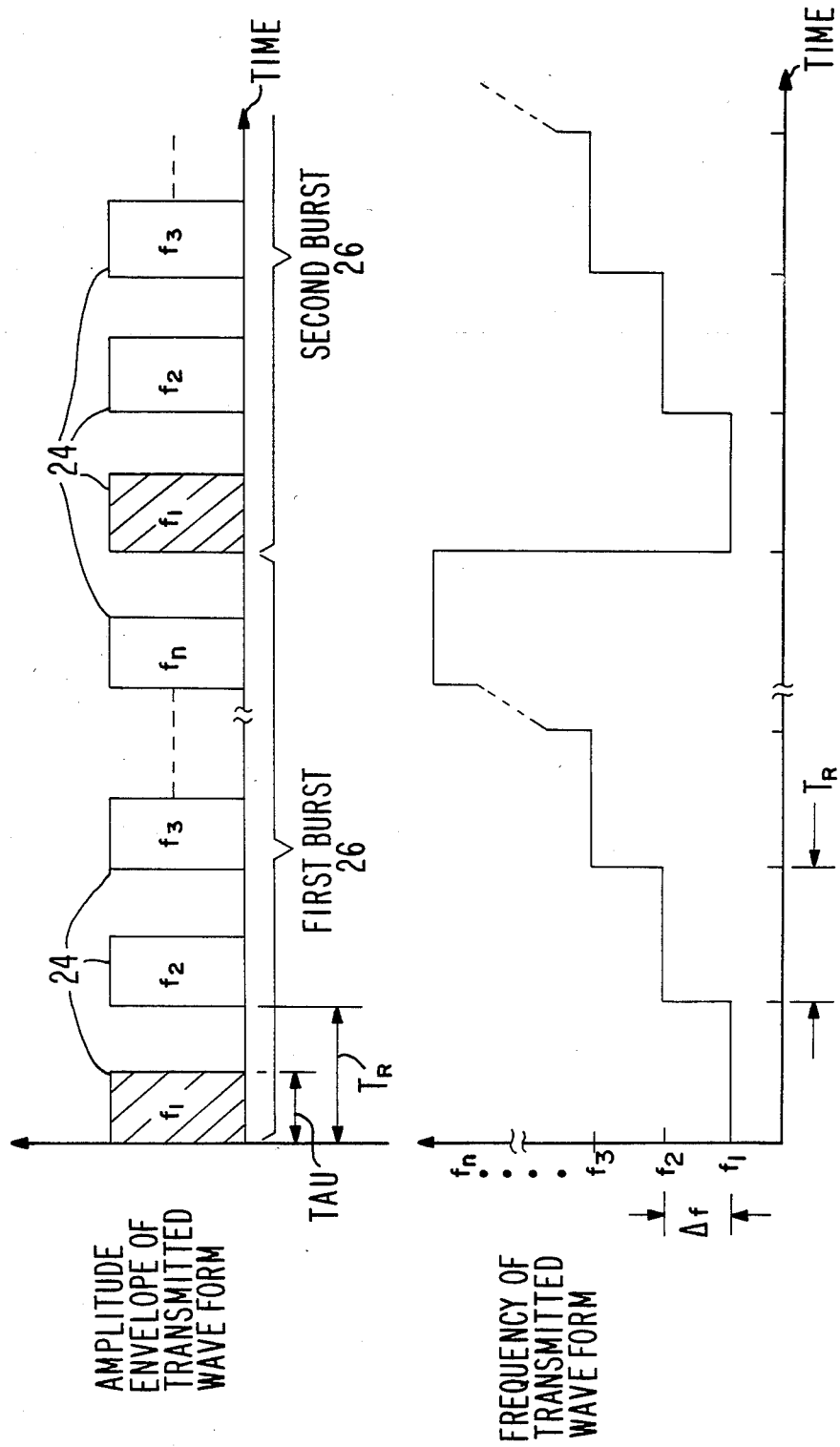
FIG. 6 illustrates the frequency stepped pulses 24 transmitted by transmitter 34.

The coherent train of pulses 24 has n pulses 24 per burst 26, and N bursts per image frame (integration period) 28. The signal-to-noise ratio is proportional to nN. The waveforms of FIG. 6 show the first and part of the second burst 26 of an image frame 28, and the manner in which the frequency is stepped. The duration tau of each pulse is typically between 20 nanoseconds and 50 nanoseconds. Available modulation schemes place a lower limit on tau, and clutter power places an upper limit on tau.

For $B=2.5°$ and $R_m=5$ kilometers, enough data is obtained so that one does not have to utilize ambiguous range processing. The repetition frequency $1/T_R$ of the transmitted pulses 24 is a function of the unambiguous range $R_m$.

For unambiguous range processing, the total interpulse period $T_R$ must be at least equal to the sum of $T_i$ (unambiguous range period, approximately 30 microseconds for a 5 km range) and $T_a$ (time to tilt array 32 through $\Delta A$ degrees, where $\Delta A$ is the step of A necessary to counteract a $\Delta f$). In order to maintain the high data rate capability of seeker 8 in the imaging mode, $T_a$ should be minimized. As the value of ΔA increases and/or the value of $T_a$ decreases, greater power is required for motor 10.

An alternative embodiment is to move array 32 continuously rather than discretely. The continuous embodiment is viable because the required ΔA for each frequency step Δf is small compared to B (see Table 3). The small angular motion of array 32 during the $T_i$ period can be compensated for by signal processing within computer 40. A major advantage of this continuous embodiment is the simplification of array 32 motion requirements and alleviation of the potential angular precision problem.

FIG. 7 shows the effect produced by the "nodding" (stepwise changes in angle A) of antenna 12, and indicates that the "staring" of beam 14 can be performed anywhere within FOV 16 of seeker 8. During the imaging mode, for every step change in frequency of the transmitted signal, motor 10 adjusts angle A by a designated amount in the appropriate direction in order to compensate for the radial change of beam 14 scan angle s caused by the change in frequency. This technique forces beam 14 to remain fixed in space and to continuously illuminate target 2.

The signal radiated by antenna 12 reflects off target 2 and becomes an echo signal. The echo signal is received by receiver 36 and is known in amplitude, frequency, and phase. An inverse Fourier transform across a single received burst 26 is performed by computer 40, yielding a distribution of amplitude and as a function of time. This is readily converted to a distribution of amplitude as a function of range, since range is directly proportional to time. The range domain of this amplitude versus range distribution is broken into a finite number of range bins corresponding to the resolution in range, which is known in advance. This process is repeated for all N bursts 26 in a frame 28; the amplitude values for all bursts 26 are summed range-bin by range-bin. Then for each range bin, computer 40 performs a Fourier transform on the amplitude versus range information, yielding a distribution of amplitude versus doppler frequency. Image 4 is then displayed as amplitude as a function of range (first dimension) and doppler frequency (cross-range; second dimension). Image 4 can be pre-processed by target recognition algorithms, and/or direct utilization of specific scatterers for missile 6 guidance and homing functions.

A simulated image 4 is illustrated in FIG. 8 for an apparent aircraft target 2. The level of detail, and hence the quality of image 4, is dependent upon the resolution established in the two dimensions: range and cross-range. The resolution in range is a function of the time duration of each pulse 24 transmitted by the seeker 8. The resolution in cross-range is a function of how much the doppler changes.

As the operating bandwidth of seeker 8 increases, the target 2 radial velocity (relative motion) produces significant distortion in the range distribution (amplitude as a function of range). These effects can be corrected by proper motion compensation of the N range distributions. The range distribution for the first burst 26 is used as a reference signature, and the subsequent bursts 26 within the frame 28 are range-aligned in accordance with the motion of target 2. The number n of pulses 24 in a burst 26 and the number N of bursts 26 in an image frame 28 dictate the resolution characteristics and thus the final image quality that can be obtained.

Assume that the launch aircraft avionics equipment detects an enemy radar 2 tracking the aircraft. The avionics provides initial target 2 position data to missile 6, which is launched and guided inertially to an appropriate terminal acquisition region in space. Once missile 6 arrives at the proper location, seeker 8 is automatically turned on by computer 40, and performs a search within its FOV 16, detecting and acquiring target 2, at which time computer 40 places seeker 8 into the tracking mode. Since seeker 8 has a very narrow instantaneous field-of-view 14 within its total wide FOV 16, it processes target 2 data only from a specific air defense site, thus achieving isolation from neighboring sites, enabling an autonomous launch-and-leave weapon capability.

The tracking of target 2 could be accomplished by either sequential lobing or by track-while-scan techniques. In the case of sequential lobing, after target 2 acquisition is accomplished, the radial frequency scan of antenna 12 is stopped and a pair of beams 14 is generated repetitively sequentially by synthesizer 20 to derive tracking information. At the same time, turntable 18 begins a dither to provide error signal generation. The two beam 14 positions move from the periphery of the scan region within FOV 16 towards its center. Alternately, missile 6 commands could be controlled to maintain the pair of beams 14 biased at fixed angles from the center of FOV 16. In either case, because of the radial orientation of beams 14, missile 6 is roll decoupled from seeker 8. Computer 40 generates the commands to implement the sequential lobing.

For the track-while-scan technique, the radial frequency-scan continues to operate and the received information is processed beam-by-beam and scan-by-scan by computer 40, which forms the target track association and derives guidance information. Computer 40 can also be used to obtain fine position information by performing end-point estimation and thus produce an equivalent beam 14 splitting process.

Seeker 8 is rotated continuously by turntable 18 in the circumferential (w) direction when missile 6 is in the scanning mode, but not when missile 6 is in the imaging mode. When computer 40 switches seeker 8 to the imaging mode following target 2 acquisition, circumferential rotation is stopped with beam 14 in the radial scan plane Q.

FIG. 9 illustrates the relationship between A, scan angle s, and beam angle v. FIG. 9 is drawn in the radial scan plane Q. A is assumed to be 20 degrees. Scan angle s, which is assumed to vary from 0 degrees through −20 degrees in response to synthesizer 20 sweeping through a 95.5 GHz to 92.5 GHz bandwidth (see Table 2), is measured from the broadside to plane 32.

Beam angle v is defined to be s+A, where v is the angle between the boresight of beam 14 and the Z-axis. v, s, and A all increase in the clockwise direction. Beam 14 lies along the Z-axis (v=0°) at a frequency of 92.5 Ghz (where Table 2 tells us that s=−20°); and v=20° when f is 95.5 Ghz (where Table 2 tells us that s=0°).

Figure 10:
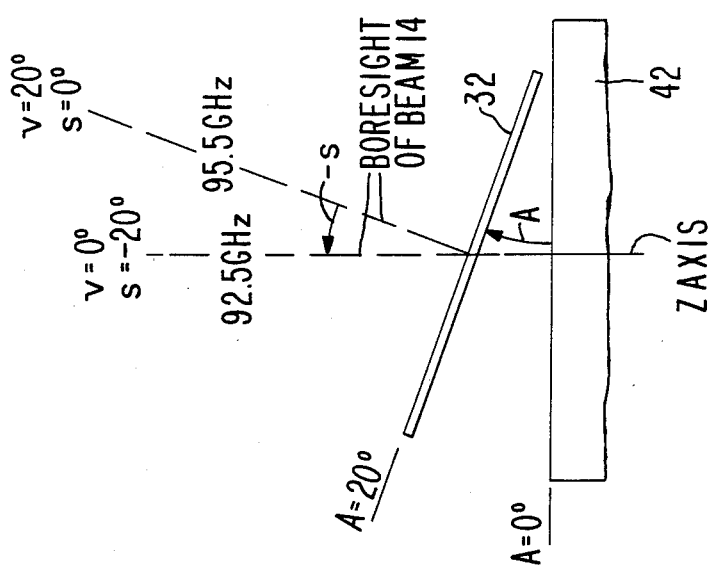
FIG. 10, which is also drawn in plane Q, illustrates the effects of utilizing motor 10 to change angle A to maintain spatial stabilization of beam 14.

FIG. 10 illustrates the imaging mode, where v remains fixed in coincidence with the target line-of-sight LOS (the angle between the midpoint of target 2 and the Z-axis), because angle A is commanded to compensate for the frequency scanning. LOS is assumed to be 10°.

A is adjusted from 10 degrees (corresponding to f=95.5 GHz, where s=0°) through 30 degrees (corresponding to f=92.5 GHz, where s=−20°).

Table 3 shows an exemplary set of frequency steps and corresponding angle A changes.

TABLE 3
Corresponding Frequency and A Steps

| Number of Frequency Steps | Antenna 12 Angle Step, ΔA (degrees) | Corresponding Frequency Deviation, Δf (MHz) |
| --- | --- | --- |
| 500 | 0.04 | 6 |
| 300 | 0.07 | 10 |
| 250 | 0.08 | 12 |
| 200 | 0.10 | 15 |
| 150 | 0.13 | 20 |
| 100 | 0.20 | 30 |
| 50 | 0.40 | 60 |

The frequency changing and corresponding A changing continues until sufficient imaging data is processed to obtain positive target 2 recognition. The stepping sequence can occur over the entire 3 GHz bandwidth, as assumed in Table 3, or just a portion thereof.

Figure 11:
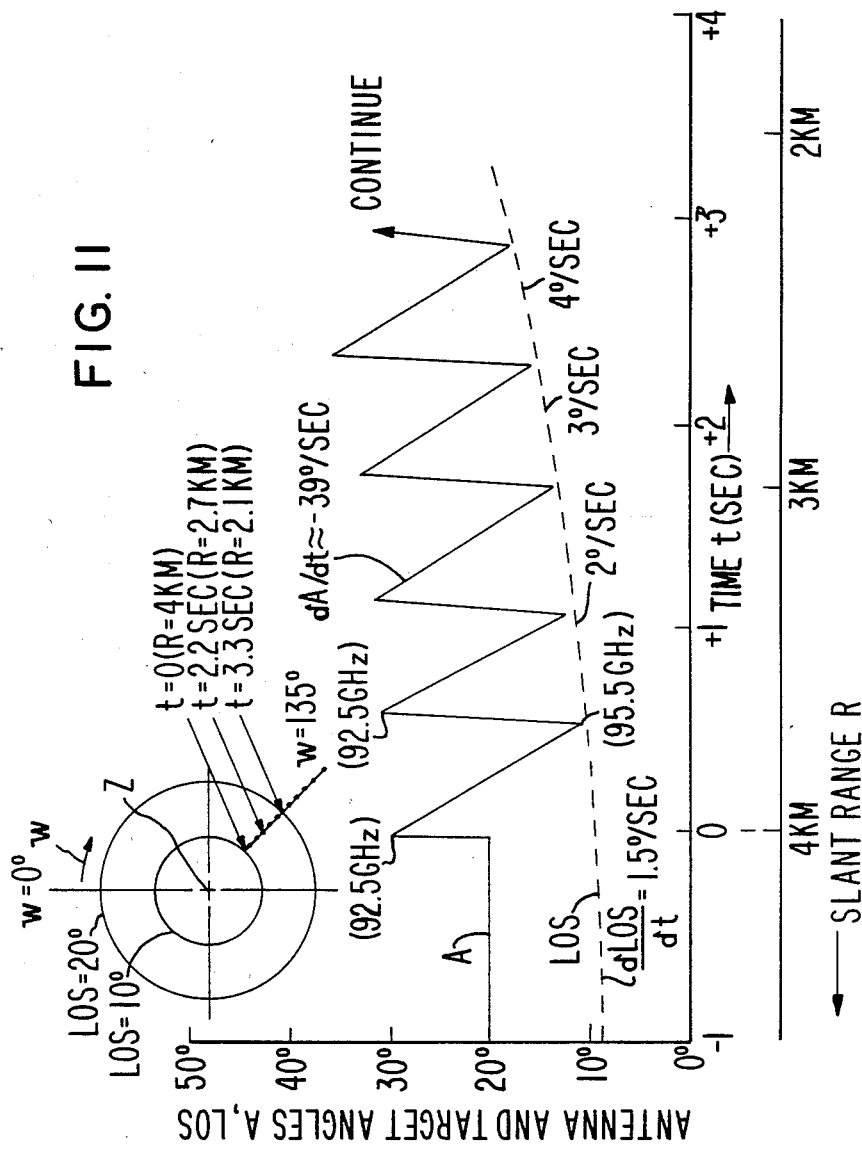
FIG. 11 illustrates A and target 2 line-of-sight as a function of time for a typical mission scenario.

The advanced imaging radar seeker 8 of the present invention is applicable to a wide range of tactical missions. FIG. 11 shows a typical imaging mission as a function of time and range. The situation shown is for seeker 8 on board a missile 6 flying a straight and level course at 500 meters altitude at a constant Mach 2.0. Target 2 is offset laterally from the flight path by 500 meters.

FIG. 11 illustrates A and LOS as a function of elapsed time t and slant range R. t is set at zero for a nominal detection slant range R of 4 kilometers. Prior to detection, A is assumed to be set at 20 degrees. In this example, LOS=10 degrees at target detection and initiation of the imaging mode. At t=0, array 32 is rapidly (within 40 milliseconds) slewed to A=30 degrees to align the 92.5 GHz beam 14 onto target 2, and the imaging mode is initiated. Angle A is stepped or continuously swept at an average rate (dA/dt) of approximately −39 degrees/second over a time period equivalent to one image frame 28 until A=LOS, corresponding to the final upper frequency of 95.5 GHz as shown. Note that LOS has increased to 11 degrees during the first image frame 28. Then array 32 is quickly slewed so that A=31 degrees, which keeps the now 92.5 GHz beam 14 on target 2. The cycle is then repeated for additional image frames 28. At all times, beam 14 remains fixed on target 2.

As R decreases, the rate of change of target bearing (dLOS/dt) increases as shown. The necessary target 2 motion compensation is implemented in computer 40.

The circle insert in FIG. 11 shows the motion of target 2 relative to the Z-axis, looking forward, as a function of time t and slant range R. The circumferential angle w is measured as shown from the seeker 8 vertical with respect to ground. Note that target 2 moves radially away from the Z-axis along a constant w as R decreases. Therefore, no adjustment of turntable 18 will be necessary for imaging for this example.

Figure 12:
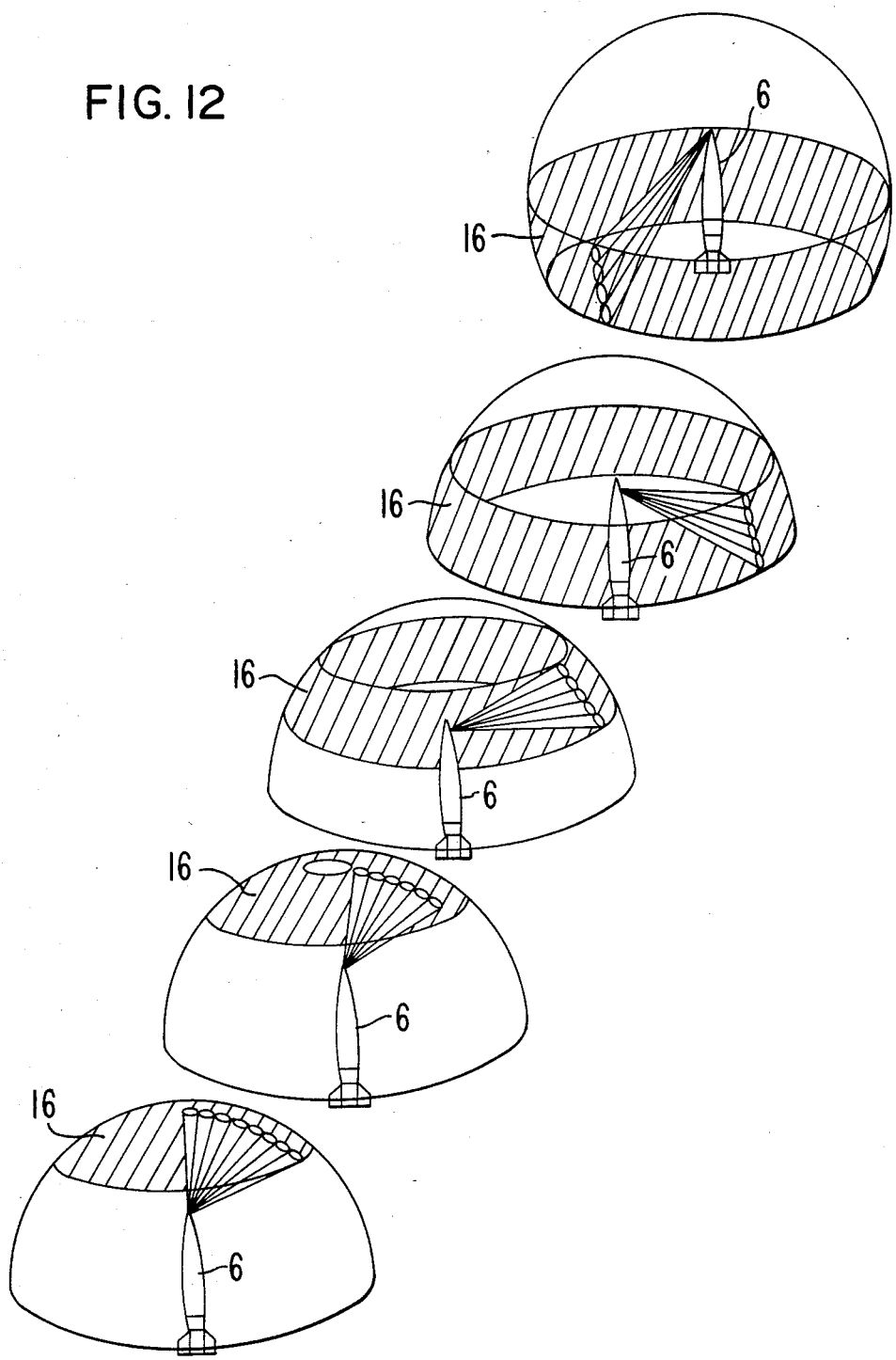
FIG. 12 shows how field-of-view 16 can be altered by changing the range of angle A.

An additional feature of seeker 8 is the capability to elevate array 32 until it is in the vertical position with respect to the Z-axis. (A=90 degrees). As the range of angle A changes, FOV 16 changes accordingly. FIG. 12 illustrates this effect: in the lower left sketch of FIG. 12, A has its lowest angular range, which provides a wide conical FOV 16. The remaining sketches illustrate the changes produced when the A range is sequentially increased to the point where the maximum A is 90° (the upper-right-hand sketch) enabling seeker 8 to "see backwards". As can be observed, FOV 16 can be adapted to a variety of mission requirements, enhancing seeker 8's flexibility and cost-effectiveness. For a maximum scan angle s of 20 degrees, the total range covered by all the FOV's in FIG. 12 is zero degrees (nose-on) to 110 degrees with respect to the Z-axis. Recalling that the 20 degrees of scan angle were obtained with a serpentine feed 22 whose phasing length was only four wavelengths long, an even greater FOV 16 is achievable if a longer serpentine feed 22 is used.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An imaging radar system for producing a two-dimensional image of a target, comprising:
    means for transmitting a series of pulses of electromagnetic energy whereby the frequencies of each two adjacent pulses differ;
    coupled to the transmitting means, means for radiating the transmitted pulses in such a way that the radiated pulses remain fixed on the target over time, and reflect off the target;
    synchronized with the transmitting means, means for receiving the reflected pulses;
    coupled to the receiving means, means for performing an inverse Fourier transform on the received pulses to produce an amplitude versus range distribution; and
    coupled to the inverse Fourier transform means, means for performing a Fourier transform on the amplitude versus range distribution to produce an amplitude versus doppler frequency distribution;
    wherein the produced image of the target is related to amplitude versus range in a first dimension, and amplitude versus doppler frequency in a second dimension;
    the frequency differences are generated by a frequency synthesizer coupled to an input of the transmitting means;
    the radiating means comprises a planar array of linear antenna elements coupled to an output of the transmitting means; and
    the radiated pulses are kept fixed on the target by tilting means which tilts the planar array to compensate for angular changes of the radiated pulses caused by changes in frequency imparted by the frequency synthesizer.

2. The system of claim 1 wherein at least part of the system is on board an airborne missile which is moving generally towards the target;
    said system further comprising means for decoupling the motion of the missile from the transmitted, radiated, and received pulses;
    said system further comprising means for tracking the target, wherein the imaging and tracking of the target can occur simultaneously.

3. The system of claim 1 wherein each transmitted pulse is radiated, reflected and received before the next pulse in the series is transmitted, so that the inverse Fourier transform means and the Fourier transform means perform unambiguous range processing.

4. The system of claim 1 wherein the tilting means comprises a linear stepping motor which actuates an extendible rod that supports the planar array.

5. The system of claim 1 wherein the tilting means comprises a motor which continuously extends a rod that supports the planar array;
wherein the motion of the planar array during the image production is compensated for by a computer which also incorporates the inverse Fourier transform means and the Fourier transform means.

* * * * *